United States Patent [19]
Simons et al.

[11] Patent Number: 5,805,890
[45] Date of Patent: Sep. 8, 1998

[54] PARALLEL PROCESSING SYSTEM INCLUDING ARRANGEMENT FOR ESTABLISHING AND USING SETS OF PROCESSING NODES IN DEBUGGING ENVIRONMENT

[75] Inventors: Joshua E. Simons, Sharon; Karen C. Jourdenais, Concord; Steven J. Sistare, Arlington, all of Mass.

[73] Assignee: Sun Microsystems, Inc., Mountain View, Calif.

[21] Appl. No.: 441,234

[22] Filed: May 15, 1995

[51] Int. Cl.⁶ ..................................................... G06F 9/45
[52] U.S. Cl. ............................................................ 395/704
[58] Field of Search .................................. 395/700, 703, 395/704, 705, 706, 800, 183.13, 183.14

[56] References Cited

U.S. PATENT DOCUMENTS

| | | | |
|---|---|---|---|
| 5,048,018 | 9/1991 | Bernstein | 395/183.14 |
| 5,113,523 | 5/1992 | Colley et al. | 395/800 |
| 5,325,530 | 6/1994 | Mohrmann | 395/700 |
| 5,371,746 | 12/1994 | Yamashita et al. | 395/183.14 |

OTHER PUBLICATIONS

Fernandez, et al., "Ddbl–LP: A Dynamic Software Tool for Debugging Asynchronous Distributed Algorithms on Loosely Coupled Parallel Processors," Journal of Systems and Software, vol. 22, No. 1, pp. 27–43, Jul. 1993.

Zhou, W., "A Layered Distributed Program Debugger," IEEE, Proc. of the 5th IEEE Symp. on Para. and Dist. Proc., pp. 665–668, Dec. 4, 1993.

Zaki, et al., "DPDP: An Interactive Debugger for Parallel and Distributed Processing," Journal of Systems and Software, vol. 22, No. 1, pp. 45–61, Jul. 1993.

Sorel, et al., "A Dynamic Debugger for Asynchronous Distributed Algorithms," IEEE Software, vol. 11, issue 1, pp. 69–76, Jan. 1994.

Griffin, et al., "A Debugger for Parallel Processes," Journal of Software Practice and Performance, vol. 18, No. 12, pp. 1179–1190, Dec. 1988.

Manabe, et al., "Debuggin Dynamic Distributed Programs Using Global Predicates," IEEE, Proc. of the 4th IEEE Symp. on Para. and Dist. Proc., pp. 402–407, Dec. 4, 1992.

Sharnowski, et al., "A Visualization–base Environment for Top–down Debugging of Parallel Programs," IEEE, Proc. of the 9th Int. Para. Proc. Symp., pp. 640–645, Apr. 1995.

*Primary Examiner*—Kevin A. Kriess
*Assistant Examiner*—Peter J. Corcoran, III
*Attorney, Agent, or Firm*—Richard A. Jordan

[57] ABSTRACT

A debugger for use in connection with a parallel computer including a plurality of processing nodes. The debugger enables the operator to establish a processing node set in response to certain criteria, such as the respective identifications of the processing node and their prior processing under the debugger. The debugger, in response to a processing node set establishment command from the operator, enables each processing node to establish and condition a set membership flag in response to the operator-supplied set membership criteria. The debugger is then responsive to a debugging command from the operator to enable the processing nodes to use their respective set membership flags to condition their execution of the debugging command.

31 Claims, 4 Drawing Sheets

PARALLEL PROCESSING SYSTEM INCLUDING ARRANGEMENT FOR ESTABLISHING AND USING SETS OF PROCESSING NODES IN DEBUGGING ENVIRONMENT

FIELD OF THE INVENTION

The invention relates generally to the field of digital computer systems and more specifically to debugging arrangement for assisting in developing computer programs for use in connection with such computer systems. In particular, the invention provides an arrangement for use in connection with a parallel processing system for establishing and using sets of processing nodes in a debugging environment.

BACKGROUND OF THE INVENTION

In developing computer programs, programmers often use "debugging" tools to enable them to verify correct operation of the programs. Using debugging tools, programmers can step through a program and determine whether the results that the program generates at various points are as would be expected. If the results are correct at one point, and not at a subsequent point, the programmer can expect that the portion of a program between the two points is in error. In debugging code for processing on a conventional single-processor ("uni-processor") computer system, it is relatively straight-forward to follow operations performed by the processor during debugging. However, in a parallel processing system, which can include a array of from several processors to several thousand processors, all processing separate streams of code on separate and distinct data, following the operations performed by the processors during debugging can be quite complicated.

SUMMARY OF THE INVENTION

The invention provides a new and improved arrangement for use in connection with a parallel processing system, to enable a code developer to observe processing of code being developed by sets of processing nodes, the processing nodes in a set being identified by the developer explicitly or implicitly in relation to processing or other conditions as identified by the developer.

In brief summary, the invention provides a new debugger for use in connection with a parallel computer including a plurality of processing nodes. The debugger enables the operator to establish a processing node set in response to certain criteria, such as the respective identifications of the processing node and their prior processing under the debugger. The debugger, in response to a processing node set establishment command from the operator, enables each processing node to establish and condition a set membership flag in response to the operator-supplied set membership criteria. The debugger is then responsive to a debugging command from the operator to enable the processing nodes to use their respective set membership flags to condition their execution of the debugging command.

BRIEF DESCRIPTION OF THE DRAWINGS

This invention is pointed out with particularity in the appended claims. The above and further advantages of this invention may be better understood by referring to the following description taken in junction with the accompanying drawings, in which:

DETAILED DESCRIPTION OF AN ILLUSTRATIVE EMBODIMENT

The invention provides an arrangement, termed herein a "processing node-set establishment arrangement," which will be described below in connection with FIGS. 2 through 4, which may be used in connection with a debugger for use in developing code for execution by a parallel computer system, the processing node set establishment arrangement enabling a code developer to easily establish sets of processing nodes in the parallel computer system for debugging and other purposes. Initially, it would be helpful to describe generally one embodiment of a parallel computer system with which the processing node set establishment arrangement operates. One such parallel computer system is depicted in FIG. 1.

Figure 1:
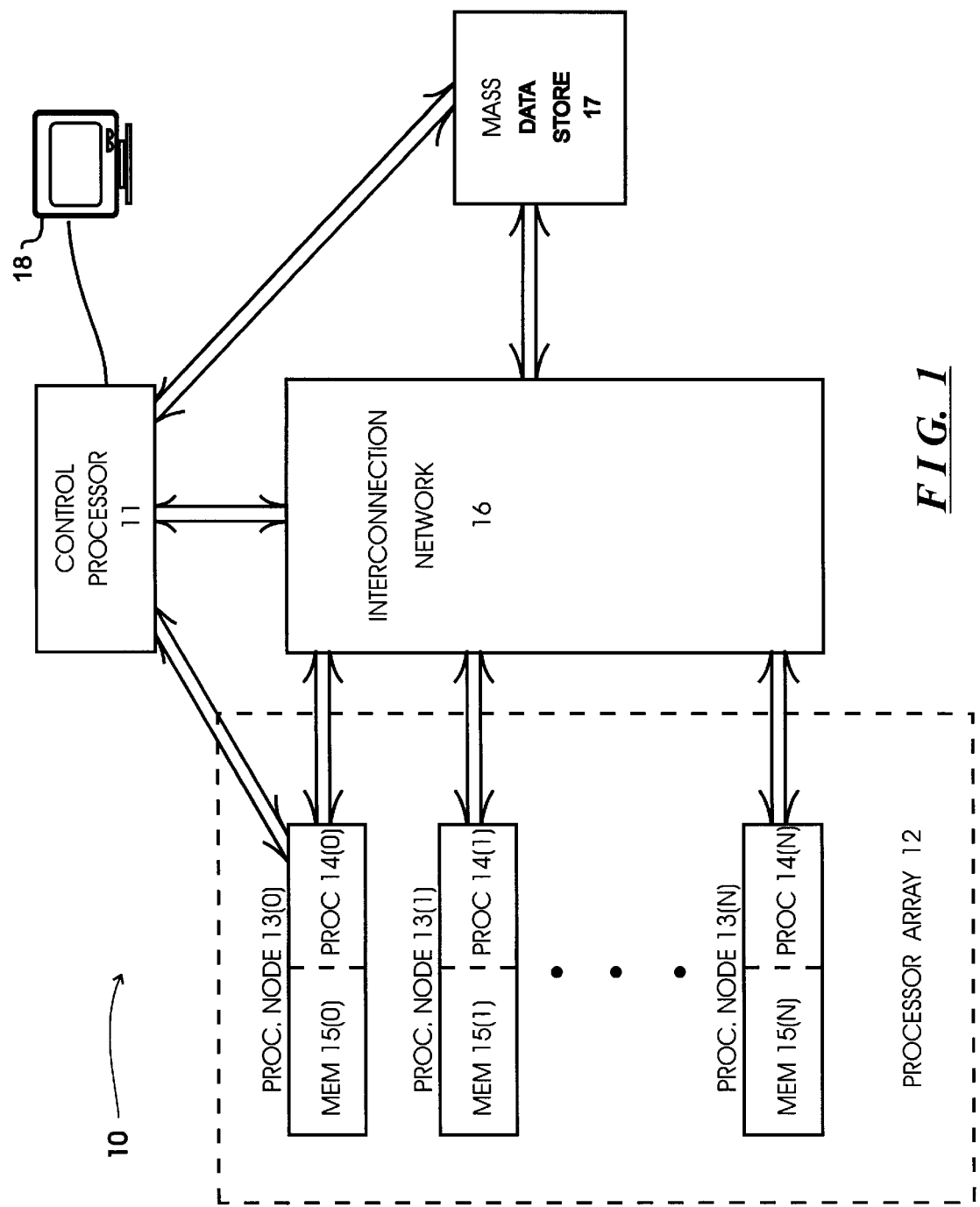
FIG. 1 is a general functional block diagram of a parallel processing system with which the arrangement for establishing and using sets processing nodes may be used.

With reference to FIG. 1, parallel computer system 10 in one embodiment includes a control processor 11 which transmits commands to a processor array 12. The processor array 12 includes a plurality of processing nodes 13(0) through 13(N) [generally identified by reference numeral 13($i$), "i" being an index from zero to "N"], each including a processor 14($i$) and a memory 15($i$). The massively-parallel computer depicted in FIG. 1 operates generally in a "MIMD," or "SPMD" manner. The control processor 11 may broadcast commands to generally control the processing nodes 13($i$). The processors 14($i$) receive the commands and, in response, may execute one or a series of instructions to process items of data in their respective memories 15($i$). (It will be appreciated that the control processor 11 may comprise a separate element, or it may comprise one of the processing nodes 13($i$) in the processor array 12.) The processing nodes 13($i$) in the processor array 12 may also generate status information during their processing which they provide to the control processor 11. The control processor 11 may, in turn, use the status information in controlling the selection and timing of commands that it sends to the processing nodes 13($i$). When operating in a MIMD manner, the processors 14($i$) execute generally separate programs of instructions.

The processor array 12 also connects to an interconnection network 16 which enables the processing nodes 13($i$) to transfer data and other information thereamong. Each processing node 13($i$) is identified by an identifier, which also serves as an address in the interconnection network 16. When one processing node 13(I) needs to send data to another processing node 13(J), it may do so in a message which identifies the recipient processing node 13(J). The interconnection network 16 will receive the message from the source processing node 13(I) and transfer it to the destination processing node 13(J). The processing nodes 13($i$) may also use the interconnection network 16 to synchronize their operations.

One embodiment of the massively-parallel computer also includes a mass data store 17 which stores data to be processed by the processing nodes 13($i$) of the processor array 12 and data that has been processed thereby. In that embodiment, the processor array 12 and mass data store 17 transfer data therebetween through the interconnection network 16. It will be appreciated that a system in accordance with the invention may be implemented in a massively parallel computer which does not include a mass data store 17 connected to network 16 as depicted in FIG. 1, but instead data storage may be performed by some or all of the processing nodes 13(i).

One embodiment of the massively-parallel computer 10 also includes an operator input arrangement such as a keyboard 19 and mouse (not shown) connected to the control processor 11, for enabling an operator to input information to control the computer, and a conventional video display 18 for enabling the display of information to the operator.

As described above, the processing node set establishment arrangement permits a code developer, as an operator of the parallel computer system 10, using, for example, the operator input and display elements 18 and 19, to establish sets of the processing nodes 13(i), which may be sub-sets of the entire set of processing nodes 13(0) through 13(N). The arrangement permits the developer to establish a processing node set by explicit identification of those ones of the processing nodes 13(i) which are to be a member of the set, as well as by identifying criteria which define the membership in a set and allowing each processing node 13(i) itself determining whether it is a member of the set. After a processing node set is established, the processing node set establishment arrangement enables the code developer to control processing by the processing nodes 13(i) that are members of the set in response to debugging commands provided thereto by the control processor 11.

Figure 2:
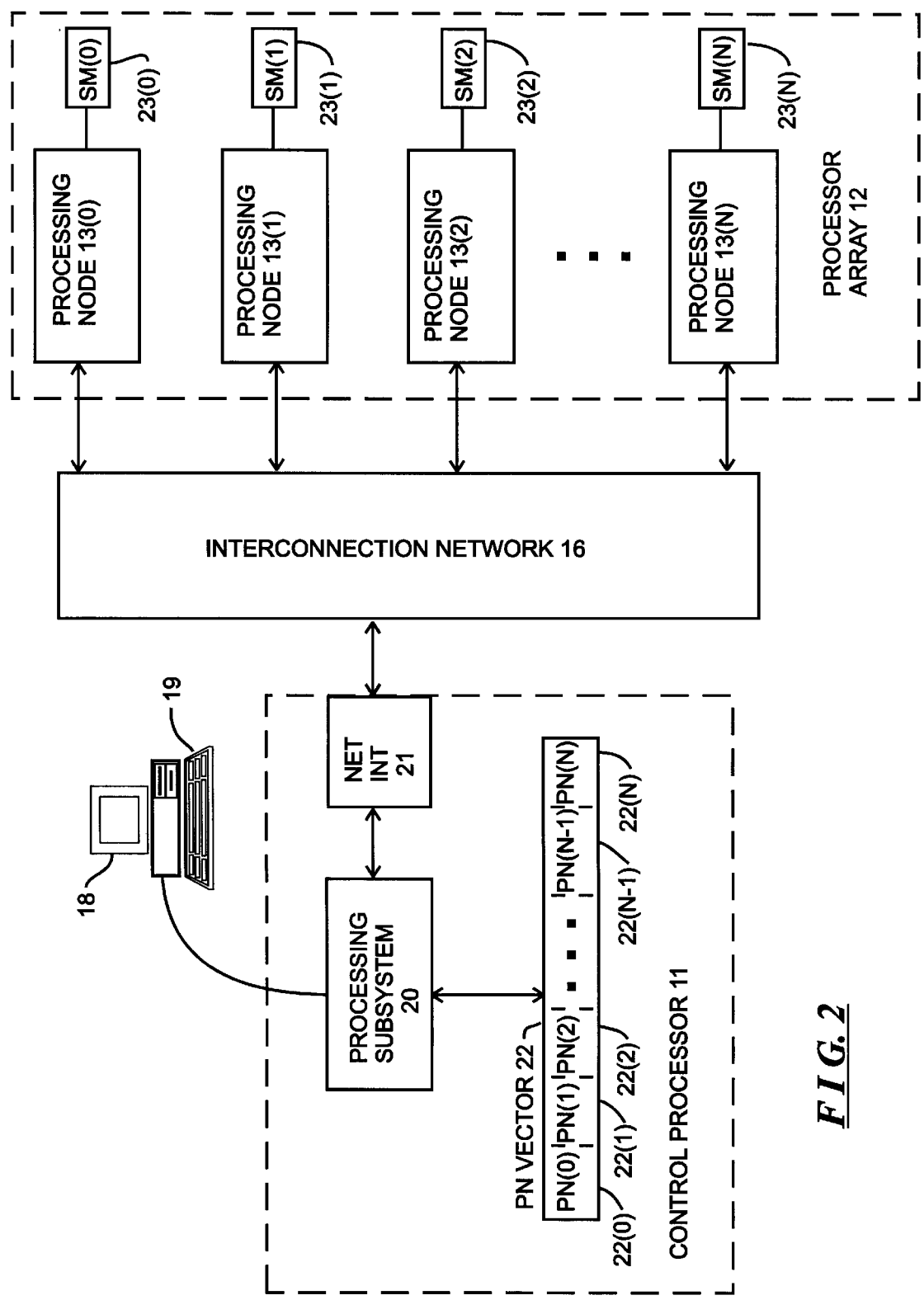
FIG. 2 depicts a data structure.

FIG. 2 depicts a portion of the parallel computer system 10, in particular, the control processor 11, processor array 12 and interconnection network 16, with the control processor 11 being depicted in somewhat more detail. As shown in FIG. 2, the control processor 11 includes a processing subsystem 20, a network interface 21 and a processing node vector bit 22. The processing subsystem 20 includes processing and storage elements (not shown) which cooperate to perform processing operations under control of programs. In that processing, the processing subsystem 20 will generate messages for transmission over the interconnection network 16 to processing nodes 13(i) in the processor array 12. The network interface 21 receives the messages generated by the processing subsystem 20 and transmits them over the interconnection network 16. In addition, the network interface 21 receives messages from the interconnection network 16, which have been generated by other elements of the system 10 for transmission to the control processor 11, and delivers them to the processing subsystem 20. The messages generated by the processing subsystem for transmission by the network interface 21 may include, inter alia, commands which initiate and control processing operations by the processing nodes 13(i). The messages received by the processing subsystem 20 from the network interface 21 may include, inter alia, processed data and status information generated by the processing nodes 13(i).

The processing node bit vector 22 is used to identify to the control processor 11 the processing nodes 13(i) which are members of a processing node set, As shown in FIG. 2, the processing node bit vector 22 includes a series of bit flags 22(0) through 22(N) (generally identified by reference numeral 22(i)), each of which is associated with the processing node 13(i) having the corresponding index "i." At any point in time, the condition of each bit flag 22(i) of the processing node bit vector 22 is used to indicate whether the correspondingly-indexed processing node 13(i) is a member of the then "current" processing node set. That is, if, for example, a number of bit flags 22(i) are set, the correspondingly-indexed processing nodes 13(i) will be considered members of the current processing node set, whereas the processing nodes 13 (i) for whose bit flags 22(i) are not set will not be considered members of the current processing node set. The processing nodes 13(i) which are members of the "current" processing node set may be changed by the processing subsystem 20 changing the ones of the bit flags 22(i) which are set, as will be described below in connection with FIG. 3. The processing subsystem 20 uses the processing node vector 22 to identify the processing nodes 13(i) for which it will generate messages including commands to control processing, and from which it will receive processed data and status information.

In addition to processing node vector 22, each processing node 13(i) of the the processor array 12 is provided with a set membership flag SM(i), which, like the bit flags 22(i), indicate whether the correspondingly-indexed processing node 13(i) is a member of the then "current" processing node set. In establishing a current processing node set, the control processor 11 will broadcast a message to the processing nodes 13(i) containing information defining set membership criteria, and each processing node 13(i) will determine whether it is a member of the processing node set. If so, it will set its set membership flag 23(i), and if not it will clear the set membership flag 23(i). In addition, each processing node 13(i) will transmit a message to the control processor 11 indicating whether it is a member of the processing node set, and the control processor 11 will condition the bit flags 22(i) of the processing node vector 22 in response to the messages received.

In one embodiment, the code developer/operator may specify membership in a processing node set in two ways. In one way, the developer/operator explicitly identifies the specific processing nodes 13(i) which are to be members of the processing node set. In that operation, the developer/operator can identify the indices "i" of processing nodes 13(i) which are to be members of the processing node set. After identifying the indices, the control processor 11 can broadcast a message to the processing nodes 13(i) containing a command which identifies the processing nodes which are to be members of the processing node set. The processing nodes 13(i), after receiving the message, will process the command and condition their respective set membership flags 23(i), with the identified processing nodes 13(i) setting their respective set membership flags 23(i), and the processing nodes that were not identified clearing their respective set membership flags 23(i). Each processing node 13(i) will return an acknowledgement message to the control processor 11, with each acknowledgement message indicating whether the processing node 13(i) set or cleared its associated set membership flag 23(i). The control processor 11 will condition the respective bit flags 22(i) of the processing node vector 22 in response to the acknowledgement messages from the processing nodes 13(i), setting the bit flags 22(i) associated with processing nodes 13(i) which set their respective set membership flags 23(i), and clearing the bit flags 22(i) associated with processing nodes 13(i) which cleared their respective set membership flags 23(i).

In a second way in which the developer/operator specifies membership in the processing node set, instead of identifying the specific processing nodes 13(i) by index, membership criteria will be specified implicitly by specifying processing status or conditions, and the processing nodes 13(i) which determine that their processing conforms to the specified conditions will determine that they are members of the processing node set. In that operation, the developer/operator will identify the processing status or conditions that determine set membership. A number of conditions can be specified, such as, for example, the current state of a loop index or variable used to control branching. After identifying the membership determination criteria, the control processor 11 can broadcast a message to the processing nodes 13(i) containing a command which identifies the criteria. The processing nodes 13(i), after receiving the message, will process the command and condition their respective set membership flags 23(i), with the processing nodes 13(i) whose processing status or conditions satisfy the criteria setting their respective set membership flags 23(i), and the processing nodes whose processing status or conditions did not satisfy the criteria clearing their respective set membership flags 23(i). Each processing node 13(i) will return an acknowledgement message to the control processor 11, with each acknowledgement message indicating whether the processing node 13(i) set or cleared its associated set membership flag 23(i). The control processor 11 will condition the respective bit flags 22(i) of the processing node vector 22 in response to the acknowledgement messages from the processing nodes 13(i), setting the bit flags 22(i) associated with processing nodes 13(i) which set their respective set membership flags 23(i), and clearing the bit flags 22(i) associated with processing nodes 13(i) which cleared their respective set membership flags 23(i).

After a "current" processing node set has been established by appropriate conditioning of the bit flags 22(i) of the processing node vector 22, communications will proceed between the control processor 11 and the processing nodes 13(i) in a conventional manner, with the control processor 11 transmitting messages containing debugging commands which are processed by those processing nodes 13(i) whose set membership flags 23(i) are set indicating they are members of the current processing node set. The processing nodes 13(i) will receive and process the debugging commands, and generate response messages for transmission to the control processor 11 to return processed data and status information thereto. The control processor 11 will receive and use the processed data and status information provided by those processing nodes in generating consolidated information for presentation to the developer/operator. Since, in one embodiment, commands generated by the control processor 11 are broadcast to all of the processing nodes 13(i), all of the processing nodes 13(i) will receive and process the commands, but those processing nodes 13(i) whose set membership flags 23(i) are not set, indicating they are not members of the current processing node set, will not execute the debugging command. Those processing nodes, that is, the processing nodes which did not execute the debugging command, will return response messages with either null contents, which the control processor will not use in generating the consolidated information for presentation to the developer/operator, or contents which, since the processing node did not execute the debugging command, would not reflect execution of the debugging command by the processing node.

With this background, the detailed operations performed by the parallel computer system in connection with the processing node set establishment arrangement will be described in connection with the flow-charts in FIGS. 3 and 4. FIG. 3 depicts operations performed by the control processor 11 and processing nodes 13(i) in establishing a "current" processing node set in response to explicit and implicit processing node set establishment commands from the developer/operator. FIG. 4 depicts operations performed by the control processor 11 and processing nodes 13(i) in using the current processing node set to control operations in connection with a current processing node set.

Figure 3:
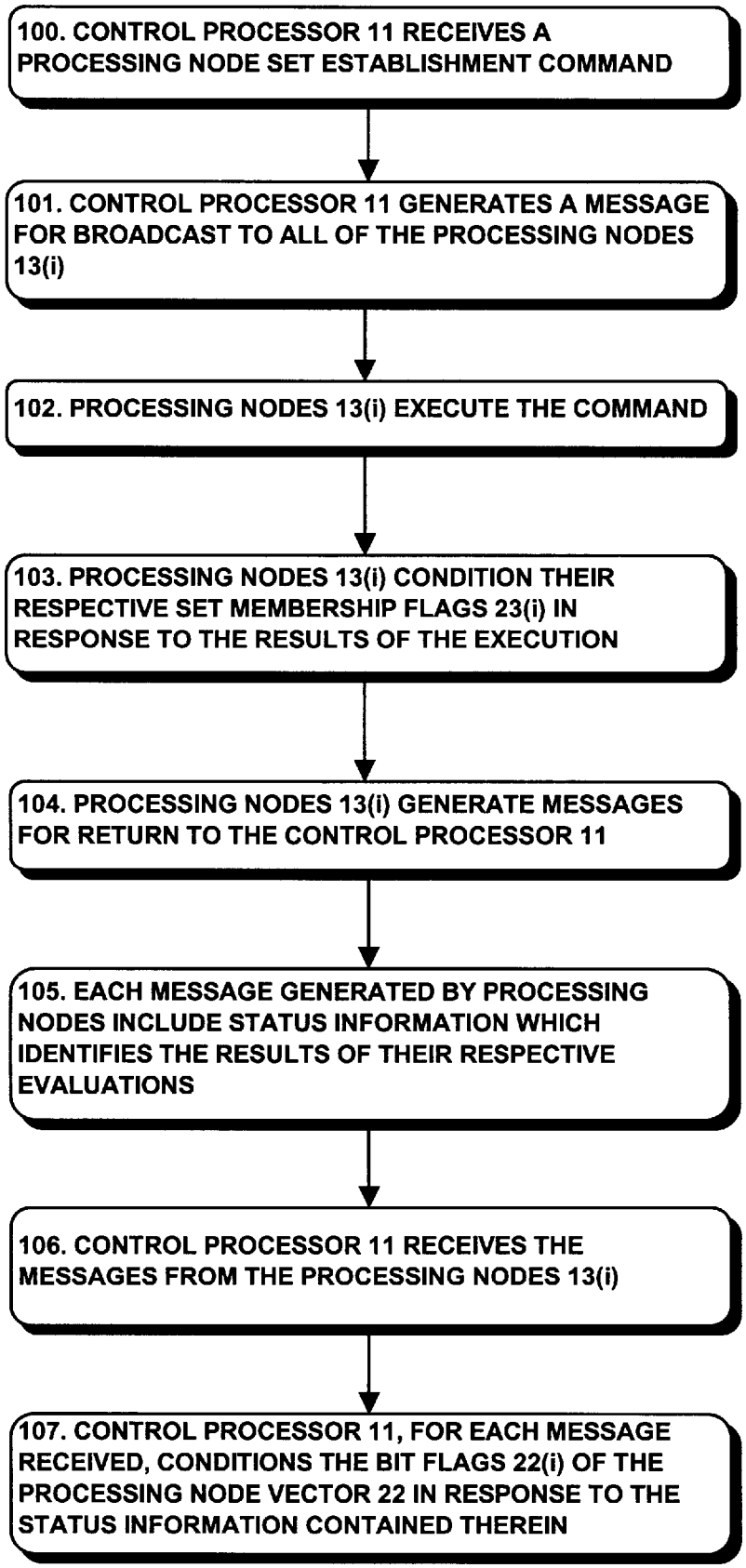
FIGS. 3 and through 4 depict flow diagrams, all of which are useful in understanding the operation of the new processing node set establishment arrangement.
Figure 4:
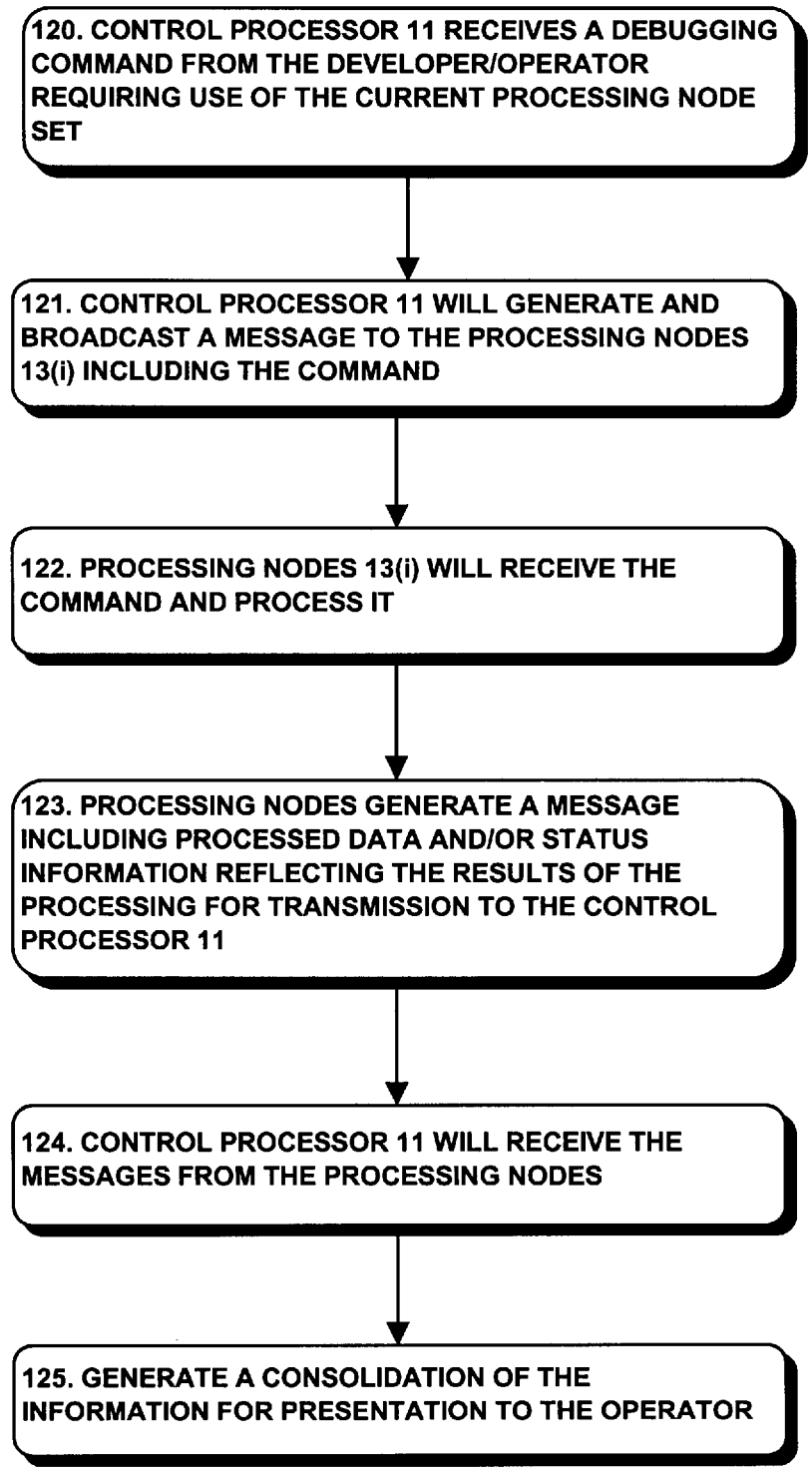

With reference first to FIG. 3, the control processor 11 will receive a processing node set establishment command from the developer/operator enable establishment of a current processing node set (step 100). The processing node set establishment command may explicitly identify the processing nodes 13(i) which are to be members of the set, or it may identify the processing status conditions which define the set. In either case, the control processor 11 will generate a message for broadcast to all of the processing nodes 13(i) including a command (step 101). The command may include a set of processing node identifiers and enable the processing nodes 13(i) to determine whether they are identified, in the case of an explicit processing node set establishment command from the developer/operator. Alternatively, the command in the message generated by the control processor 11 may identify a processing condition and enable the processing nodes 13(i) to determine whether their processing satisfies the condition, in the case of an implicit processing node set establishment command from the developer/operator. In either case, the processing nodes 13(i) execute the command (step 102), condition their respective set membership flags 23(i) in response to the results of the execution (step 103), and generate messages for return to the control processor 11 (step 104), each message including status information which identifies the results of their respective evaluations (step 105). The control processor 11 receives the messages from the processing nodes 13(i) (step 106) and, for each message received, conditions the bit flags 22(i) of the processing node vector 22 in response to the status information contained therein (step 107). Thus, if the status information in a message indicates that the processing node set its respective set membership flag 23(i), the control processor 11 will set the processing node's associated bit flag 22(i) of the processing node vector 22. On the other hand, if the status information indicates that the processing node 13(i) cleared its respective set membership flag 23(i), the control processor 11 will clear the processing node's associated bit flag 22(i) of the processing node vector 22.

As described above, after establishing a processing node set as a current processing node set, the control processor 11 will use the current processing node set in processing during the debugging session. The operations that are performed in connection with a current processing node set will be described in connection with FIG. 4. With reference to FIG. 4, the control processor 11 will initially receive a debugging command from the developer/operator requiring use of the current processing node set (step 120). The control processor 11 will then generate and broadcast a message to the processing nodes 13(i) including the command (step 121). The processing nodes 13(i) will receive the command and process it (step 122), and will generate a message including processed data and/or status information reflecting the results of the processing for transmission to the control processor 11 (step 123). For the processing nodes 13(i) whose set membership flags 23(i) are clear, indicating they are not members of the current processing node set, the messages will essentially include nulls. The control processor 11 will receive the messages from the processing nodes (step 124) and generate a consolidation of the information for presentation to the operator (step 125).

Although the processing node set establishment arrangement has been described as allowing a code developer/operator to define a processing node set using either explicit criteria, by explicitly identifying the processing nodes 13(i) which are to be members of a processing node set, or implicit criteria, by identifying processing status which defines the members of the set, in one embodiment the developer/operator can use both explicit and implicit criteria in the same processing node set establishment command, and indeed may use several groups of implicit criteria, along with explicit criteria, in the same command. In that embodiment, set establishment criteria may be combined using conventional set notation to generate unions, intersections, set difference and the like. In addition, a developer/operator can associate processing node set establishment criteria with a "name" and enable establishment of a current processing node set with reference to one or more processing node set establishment criteria names, which the developer/operator can select to be sematically meaningful in the context of a debugging session. In one embodiment, several predefined names are provided, such as "stopped," which defines processing nodes which are stopped in response to a debugging breakpoint, "running," which defines processing nodes which are running (that is, not stopped), and "error," which defines processing nodes which have encountered an error. In addition, in that embodiment, a current processing node set can be defined using combinations of processing node set names defined using the above-described set notation.

The invention provides a number of advantages. It will be appreciated that the invention provides an arrangement by which a developer/operator can, while developing code, identify groups of one or more processing nodes 13($i$) to execute a command, either explicitly by identifying the particular processing nodes 13($i$) or implicitly by identifying conditions to be satisfied by the nodes for membership. Accordingly, the developer/operator can, during a debugging session, enable one or only a few of the many processing nodes 13($i$) which may be present in a parallel processing system to step through code being developed, observe the results and use the results and expected results to determine whether the code being developed is controlling the processing nodes 13($i$) in the manner desired. Since the arrangement allows the developer/operator to select the processing nodes 13($i$) based on their respective processing conditions, the operator can select the processing nodes based on, for example, branching and similar conditions to facilitate observation of processing by the processing nodes 13($i$) for each of the various branches or conditions.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. For use in connection with a parallel computer including a plurality of processing nodes, a debugging arrangement for facilitating the debugging of code by an operator comprising:
   A. a debug set membership establishment element responsive to a processing node set establishment command from the operator to said parallel computer to establish a processing node set comprising selected ones of said processing nodes in response to operator-supplied set membership criteria; and
   B. a debug set operational element responsive to a debugging command from the operator to enable each processing node to condition its execution of the debugging command based on whether it is one of said selected ones of said processing nodes in said processing node set.

2. A debugging arrangement as defined in claim 1 in which said debug set membership establishment element includes:

A. a plurality of set membership flags each associated with one of said processing nodes, each set membership flag having a set member condition and at least one other condition, and
B. a set membership flag conditioning element for enabling each processing node to condition its set membership flag in response to said operator-supplied set membership criteria.

3. A debugging arrangement as defined in claim 2 in which ones of said processing nodes which are associated with set membership flags having the set member condition comprise said processing node set.

4. A debugging arrangement as defined in claim 2 in which each processing node is associated with a processing node identifier value, and said operator-supplied membership criteria includes processing node identifier values for processing nodes which are to condition their set membership flags to the set member condition.

5. A debugging arrangement as defined in claim 4 in which ones of said processing nodes whose processing node identifier values are not identified in said operator-supplied membership criteria condition their set membership flags to said at least one other condition.

6. A debugging arrangement as defined in claim 3 in which said operator-supplied membership criteria includes processing condition information for processing by said processing nodes, each said processing node processing said processing condition information to determine whether it is to condition its set membership flag to the set member condition.

7. A debugging arrangement as defined in claim 6 in which each said processing node further processes said processing condition information to determine whether it is to condition its set membership flag to said at least one other condition.

8. A debugging arrangement as defined in claim 1 further comprising a control element for providing said debugging commands to said processing nodes, the ones of said processing nodes in said processing node set processing said debugging commands and providing processed debugging information to said control element in response.

9. A debugging arrangement as defined in claim 8 in which ones of processing nodes which are not in said processing node set provide information to said control element which so indicate.

10. A debugging arrangement as defined in claim 8 in which said control element further comprises a processing node vector comprising a plurality of processing node vector flags each associated with one of said processing nodes, said control element conditioning the processing node vector flags associated with said ones of said processing nodes which are in said processing node set.

11. For use in connection with a parallel computer including a plurality of processing nodes, a debugging method for facilitating the debugging by an operator of code processed by a parallel computer comprising a plurality of processing nodes, said debugging method comprising the steps of:
   A. in response to a processing node set establishment command from the operator to said parallel computer, establishing a processing node set comprising selected ones of said processing nodes in response to operator-supplied set membership criteria; and
   B. in response to a debugging command from the operator, enabling each processing node to condition its execution of the debugging command based on whether it is one of said selected ones of said processing nodes in said processing node set.

12. A debugging method as defined in claim 11 in which said debug set membership establishment step includes the step of enabling each processing node to condition set membership flag associated therewith to one of said set member condition or at least one other condition in response to said operator-supplied set membership criteria.

13. A debugging method as defined in claim 12 in which ones of said processing nodes which are associated with set membership flags having the set member condition comprise said processing node set.

14. A debugging method as defined in claim 12 in which each processing node is associated with a processing node identifier value, and said operator-supplied membership criteria includes processing node identifier values for processing nodes which are to condition their set membership flags to the set member condition.

15. A debugging method as defined in claim 14 in which ones of said processing nodes whose processing node identifier values are not identified in said operator-supplied membership criteria condition their set membership flags to said at least one other condition.

16. A debugging method as defined in claim 13 in which said operator-supplied membership criteria includes processing condition information for processing by said processing nodes, each said processing node during said debug set membership establishment step being enabled to process said processing condition information to determine whether it is to condition its set membership flag to the set member condition.

17. A debugging method as defined in claim 16 in which each said processing node during said debug set membership establishment step is enabled to process said processing condition information to determine whether it is to condition its set membership flag to said at least one other condition.

18. A debugging method as defined in claim 11 further comprising the step of enabling a control element to provide said debugging commands to said processing nodes, the ones of said processing nodes in said processing node set processing said debugging commands and providing processed debugging information to said control element in response.

19. A debugging method as defined in claim 18 in which ones of processing nodes which are not in said processing node set are enabled to provide information to said control element which so indicate.

20. A debugging method as defined in claim 18 in which said control element is further enabled to condition ones of processing node vector flags associated with respective ones of said processing nodes which are in said processing node set.

21. For use in connection with a parallel computer including a plurality of processing nodes, a debug computer program product for facilitating the debugging of code by an operator comprising:

A. a debug set membership establishment module for enabling said parallel computer, in response to a processing node set establishment command from the operator, to establish a processing node set comprising selected ones of said processing nodes in response to operator-supplied set membership criteria; and B. a debug set operational module for enabling each processing node, in response to a debugging command from the operator, to condition its execution of the debugging command based on whether it is one of said selected ones of said processing nodes in said processing node set.

22. A debug computer program product as defined in claim 21 in which said debug set membership establishment module includes:

A. a set membership establishment module for enabling each said processing node to establish a set membership flag associated therewith, each set membership flag having a set member condition and at least one other condition, and B. a set membership flag conditioning module for enabling each processing node to condition its set membership flag in response to said operator-supplied set membership criteria.

23. A debug computer program product as defined in claim 22 in which ones of said processing nodes which are associated with set membership flags having the set member condition comprise said processing node set.

24. A debug computer program product as defined in claim 22 in which each processing node is associated with a processing node identifier value, and said operator-supplied membership criteria includes processing node identifier values for processing nodes which are to condition their set membership flags to the set member condition.

25. A debug computer program product as defined in claim 24 in which ones of said processing nodes whose processing node identifier values are not identified in said operator-supplied membership criteria condition their set membership flags to said at least one other condition.

26. A debug computer program product as defined in claim 23 in which said operator-supplied membership criteria includes processing condition information for processing by said processing nodes, said set membership flag conditioning module enabling each said processing node to process said processing condition information to determine whether it is to condition its set membership flag to the set member condition.

27. A debug computer program product as defined in claim 26 in which said set membership flag conditioning module further enables each said processing node to process said processing condition information to determine whether it is to condition its set membership flag to said at least one other condition.

28. A debug computer program product as defined in claim 21, said parallel computer further comprising a control element, the debug computer program product further including a control module for enabling said control element to provide said debugging commands to said processing nodes, and to receive debugging information from ones of said processing nodes in said processing node set.

29. A debug computer program product as defined in claim 28 in which said control module further enables said control element to receive information from ones of processing nodes which are not in said processing node set.

30. A debug computer program product as defined in claim 28 in which said control module further enables said control element to establish a processing node vector comprising a plurality of processing node vector flags each associated with one of said processing nodes, and condition the processing node vector flags associated with said ones of said processing nodes which are in said processing node set.

31. A debug computer program product as defined in claim 21 in which said debug set membership establishment module and said debug set operational module are encoded on a computer readable medium.

* * * * *